United States Patent
Kim

(10) Patent No.: US 9,058,546 B2
(45) Date of Patent: Jun. 16, 2015

(54) IMAGE FORMING APPARATUS FOR PROVIDING USER INTERFACE AND METHOD THEREOF

(71) Applicant: Samsung Electronics Co., Ltd., Suwon-si (KR)

(72) Inventor: Ji-hoon Kim, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/162,214

(22) Filed: Jan. 23, 2014

(65) Prior Publication Data
US 2015/0029539 A1    Jan. 29, 2015

(30) Foreign Application Priority Data
Jul. 29, 2013  (KR) .................. 10-2013-0089472

(51) Int. Cl.
    G06K 15/00    (2006.01)
(52) U.S. Cl.
    CPC .................... G06K 15/005 (2013.01)
(58) Field of Classification Search
    USPC ........................................ 358/1.15
    See application file for complete search history.

(56) References Cited

U.S. PATENT DOCUMENTS

| 7,167,255 B1* | 1/2007 | Mikami et al. ............... 358/1.15 |
| 2006/0044601 A1* | 3/2006 | Misawa et al. ............... 358/1.15 |
| 2011/0128576 A1* | 6/2011 | Tashiro ........................ 358/1.15 |

FOREIGN PATENT DOCUMENTS

JP    2006-184703    7/2006

OTHER PUBLICATIONS

Takahiro, Inage Forming Apparatus, Jul. 13, 2006, Machine Translated Japanese Patent Application, JP2006184703, All pages.*

* cited by examiner

*Primary Examiner* — Ngon Nguyen
(74) *Attorney, Agent, or Firm* — Staas & Halsey LLP

(57) ABSTRACT

A method for providing a user interface of an image forming apparatus and image forming apparatus are provided. The method includes displaying a setting user interface (UI) to set a function of the image forming apparatus, and when a user manipulation is not input to the setting UI for a predetermined time before a user finishes setting the function, temporarily storing setting information that the user has input through the setting UI. The method includes when a predetermined event occurs, re-displaying the setting UI corresponding to the setting information. Accordingly, the UI is effectively provided.

17 Claims, 11 Drawing Sheets

IMAGE FORMING APPARATUS FOR PROVIDING USER INTERFACE AND METHOD THEREOF

CROSS-REFERENCE TO RELATED APPLICATIONS

This application is related to, and claims priority to, Korean Patent Application No. 10-2013-0089472, filed on Jul. 29, 2013 in the Korean Intellectual Property Office, the disclosure of which is incorporated herein by reference in its entirety.

BACKGROUND

1. Field

Exemplary embodiments relate to an image forming apparatus for providing a user interface and a method thereof, and more particularly, to an image forming apparatus that provides a user interface effectively according to whether a user manipulation is input or not, and a method thereof.

2. Description of the Related Art

With the development of electronic technologies, various office appliances are increasingly used. An image forming apparatus such as a printer, a scanner, and a multi function peripheral is a representative of the office appliances. The image forming apparatus may be purchased by an individual and may be used at home, and may commonly be used in an environment where a plurality of users exist like a company, a public office, and a research institute.

The image forming apparatus may provide user interfaces of various forms to allow users to select and execute various functions. Generally, a visual user interface displayed on a display may be used. The user may set various functions of the image forming apparatus through the user interface.

Some of the related-art image forming apparatuses may have a function of returning to an initial screen when the user leaves the image forming apparatus in the middle of performing a predetermined job and a predetermined time elapses.

In this case, since the image forming apparatus may return to the initial screen regardless of the user's intention, the user may need to go through a complicated process to reach the menu that they have used before, which causes inconvenience to the user. Since the values that the user has set according to characteristics of the apparatus may be deleted, the user may need to re-set the values again, which also causes inconvenience to the user.

In attempt to address the problems, a function of automatically returning to the initial screen may be set so as to be inactivated. However, in this case, a problem may result in that the menus and settings that the user has previously chosen may be inadvertently exposed to other users.

Therefore, there is a need for an apparatus and method for providing a user interface (UI) environment in which the apparatus can return to a screen of an uncompleted job with a simple input, and continue to perform the job.

SUMMARY

One or more exemplary embodiments may overcome the above disadvantages and other disadvantages not described above.

One or more exemplary embodiments provide an image forming apparatus that provides a user interface (UI) effectively according to whether a user manipulation is input, and a UI providing method thereof.

According to an aspect of an exemplary embodiment, a method for providing a user interface of an image forming apparatus is provided, the method including displaying a setting user interface (UI) to set a function of the image forming apparatus, when a user manipulation is not input to the setting UI for a predetermined time before a user finishes setting the function, temporarily storing setting information that the user has input through the setting UI, and when a predetermined event occurs, re-displaying the setting UI corresponding to the setting information. According to an exemplary embodiment, a method includes after temporarily storing the setting information, displaying an initial UI.

A shortcut icon may be displayed on the initial UI and the event may be an event in which the shortcut icon is selected.

The setting UI may include a plurality of pages, and the re-displaying the setting UI may include re-displaying a page that was displayed last from among the plurality of pages based on the setting information.

At least one of the plurality of pages may display a menu for setting a shortcut function to temporarily store the setting information and return to the setting UI according to the event.

The method may include, when the setting UI is re-displayed, deleting the setting information.

The setting UI may be displayed when the user logs in and inputs a setting command for the function, and the setting information may be matched with user login information and stored. The event may be an event in which the user re-logs in.

The setting UI may be displayed when the user logs in and inputs a setting command for the function, and the setting information may be matched with user login information and stored. The re-displaying the setting UI corresponding to the setting information may include: when the user re-logs in, displaying a shortcut icon on the initial screen, and when an event in which the shortcut icon is selected occurs, re-displaying the setting UI.

According to an aspect of an exemplary embodiment, an image forming apparatus is provided including a display configured to display a setting UI to set a function of the image forming apparatus, an inputter configured to receive setting information which is set through the setting UI; a storage configured to store the setting information, and when a user manipulation is not input to the setting UI for a predetermined time before a user finishes setting the function, a controller configured to temporarily store the setting information that the user has input in the storage. According to an exemplary embodiment, the controller is configured to display an initial UI on the display after temporarily storing the setting information. When a predetermined event occurs, the controller may re-display the setting UI corresponding to the setting information on the display.

A shortcut icon may be displayed on the initial UI and the event may be an event in which the shortcut icon is selected.

The setting UI may include a plurality of pages, and, when the predetermined event occurs, the controller may re-display a page that was displayed last from among the plurality of pages based on the setting information.

At least one of the plurality of pages may display a menu for setting a shortcut function to temporarily store the setting information and return to the setting UI according to the event.

When the setting UI is re-displayed, the controller may delete the setting information from the storage.

The display may display the setting UI when the user logs in and inputs a setting command for the function, and the controller may match the setting information with user login information and store the setting information with the user login information in the storage. The event may be an event in which the user re-logs in.

The display may display the setting UI when the user logs in and inputs a setting command for the function, and the controller may match the setting information with user login information and store the setting information with the user login information in the storage. When the user re-logs in, the controller may display a shortcut icon on the initial screen, and, when an event in which the shortcut icon is selected occurs, may re-display the setting UI.

According to the various exemplary embodiments described above, the UI can be provided effectively according to whether the user uses the UI or not. Accordingly, any inconvenience that may cause the user in a manipulating process using the UI can be solved.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
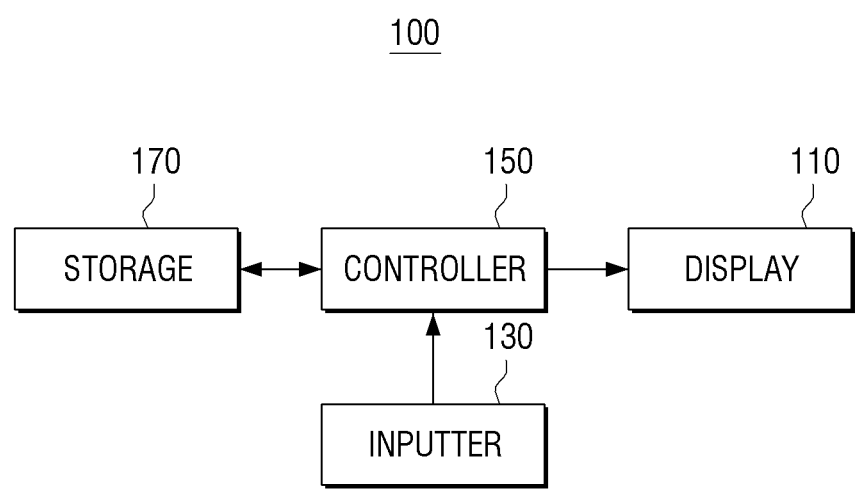
FIG. 1 illustrates a configuration of an image forming apparatus according to an exemplary embodiment.

Exemplary embodiments are described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments.

FIG. 1 illustrates a configuration of an image forming apparatus 100 according to an exemplary embodiment. Referring to FIG. 1, an image forming apparatus 100 according to an exemplary embodiment includes a display 110, an inputter 130, a controller 150, and a storage 170.

The image forming apparatus 100 may be implemented by using a printer, a scanner, a facsimile machine, a multifunction peripheral, etc.

The display 110 may display various user interface (UI) screens for a user, or may display an operation state of the image forming apparatus 100 under the control of the controller 150.

The display 110 may display a pre-stored initial screen (hereinafter, referred to as an initial UI) or a setting UI to set a function of the image forming apparatus 100.

Through the setting UI, the user may identify the function that can be performed by the image forming apparatus, and may control the operation of the image forming apparatus 100 as set by selecting the function. For example, the function that can be set by the user through the setting UI may include various options such as a number of copies, a paper size, a layout, a print density, a resolution, a paper feeder, a print orientation, and a print location on paper, and also may include various functions that are implemented by combining a plurality of functions such as a scan to mail function and a scan to fax function.

The inputter 130 may include a plurality of manipulation keys through which the user selects and sets a function supported by the image forming apparatus 100. The inputter 130 applies a key manipulation signal corresponding to a key manipulation to the controller 150, and the controller 150 controls the image forming apparatus 100 according to the key manipulation signal.

For example, the user may input setting information to the setting UI through a manipulation key of the inputter 130. The setting information recited herein refers to a value that is input by the user through the setting UI or an item that is selected by the user through the setting UI. The setting information may include information that is generated when the setting is completed (for example, an OK button or a confirm button is pressed). The setting information may include information on a value that is input before the setting is completed or an item that is selected before the setting is completed.

In FIG. 1, the inputter 130 and the display 110 are separate elements, but the inputter 130 and the display 110 may be integrated into a single element and/or may be implemented as a touch screen, which provides input and display functions simultaneously. The inputter 130 may be embedded in the display 110 and may be implemented as a touch sensor to sense a user's touch.

The controller 150 controls the overall settings of the image forming apparatus 100 according a user selection command, which is input through the inputter 130.

When the user inputs a setting command to set various functions of the image forming apparatus 100, the controller 150 displays the setting UI on the display 110. The user may select various functions through the setting UI. The setting UI refers to a screen that is displayed to allow the user to set various functions provided by the image forming apparatus 100. The controller 150 stores a setting value set for each function through the setting UI in the storage 170, and controls various function blocks included in the image forming apparatus 100 based on the setting values.

The user may be interrupted, e.g., leave from the image forming apparatus 100 without finishing setting the function in the middle of setting the function through the setting UI. The controller 150 may determine whether a user manipulation is input through the setting UI for a predetermined time when the user does not finish setting the function. When it is determined that the user manipulation is not input for the predetermined time, the controller 150 may display another screen, e.g., the initial screen of the image forming apparatus 100 or may turn off the display 110. Accordingly, a third person may be prevented from seeing the settings chosen by the user and thus security can be improved.

Even when the initial UI is displayed in the state in which the user does not finish setting the function, the user may want to go back to the image forming apparatus 10 and resume the function setting job that has been performed before. The image forming apparatus 100 may re-display the setting UI through which the user has input before, and thus the user is not required to start the setting from the beginning.

When a predetermined event occurs, the controller 150 may display the screen setting that the user had input before being interrupted, e.g., they left the area of the image forming apparatus, that is, the setting UI, on the display 110 again. For example, the event may be an event in which the user selects a shortcut icon on the initial screen, an event in which the user re-logs in, or an event in which the same user goes back to the image forming apparatus 100.

When it is determined that a user manipulation is not input through the setting UI for a predetermined time before the user finishes setting the function through the setting UI, the controller 150 may temporarily store the setting information that the user has input through the setting UI in the storage 170. The initial UI on the display 110 may then be displayed.

The predetermined time may be set in advance at the time when the image forming apparatus is manufactured and/or may be set afterward through the setting UI according to a user's preference. The predetermined time may be set to a varied time, for example, 1 minute to 5 minutes.

The controller 150 may determine whether the predetermined time elapses, for example, by counting a number of rising edges or falling edges of a clock signal from the last time when the user manipulation is sensed. When a new user manipulation is sensed, for example, while the number of rising edge or falling edges is counted, the controller 150 may reset the counted number of edges and may recount the number of edges. When it is determined that the predetermined time elapses, the controller 150 may temporarily store the setting information and may display the initial UI.

The storage 170 may include a volatile memory to store various data that is generated while the image forming apparatus 100 performs an operation, and a non-volatile memory to store various control programs necessary for implementing functions of the image forming apparatus 100. The storage 170 may store a variety of information such as a specification of the image forming apparatus 100, a use state, printing data, scan data, pre-processed data, and print history information, and may store various application programs and operating system (OS) that are used in the image forming apparatus 100.

For example, the storage 170 according to an exemplary embodiment may temporarily store the setting information that has been input through the setting UI, and may store user login information that is input from a host PC or the image forming apparatus 100. The user login information may include a user ID and a password that are assigned to the user to allow the user to use the image forming apparatus 100. When the user wants to use the image forming apparatus 100, the user may login by inputting the user login information. Accordingly, the setting information that the user has set may be matched with the user login information of the user that is input during the login process and may be stored.

Figure 2:
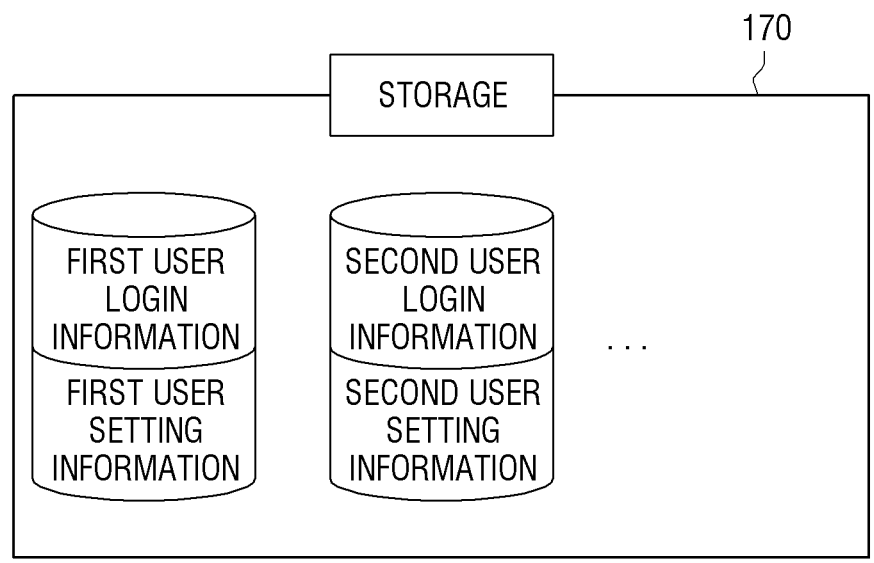
FIG. 2 illustrates an example of information stored in a storage according to an exemplary embodiment.

FIG. 2 illustrates an example of a variety of information stored in the storage 170. Referring to FIG. 2, when a plurality of users share the image forming apparatus 100, login information of each user may be stored. When a first user does not finish setting a function and a user manipulation is stopped, the controller 150 may match setting information that the first user has input, that is, first user setting information, with the login information of the first user, and may store the setting information with the login information of the first user.

When a second user finishes setting a function, the controller 150 matches the information that the second user has finished setting, that is, second user setting information with the login information of the second user, and stores the setting information with the login information of the second user.

When an event occurs regarding the first user, the controller 150 displays the setting UI using the first user setting information. On the other hand, when the second user who has finished setting the function wants to use the image forming apparatus 100 again, the controller 150 may set, e.g., automatically set the function of the image forming apparatus 100 using the second user setting information.

Figure 3:
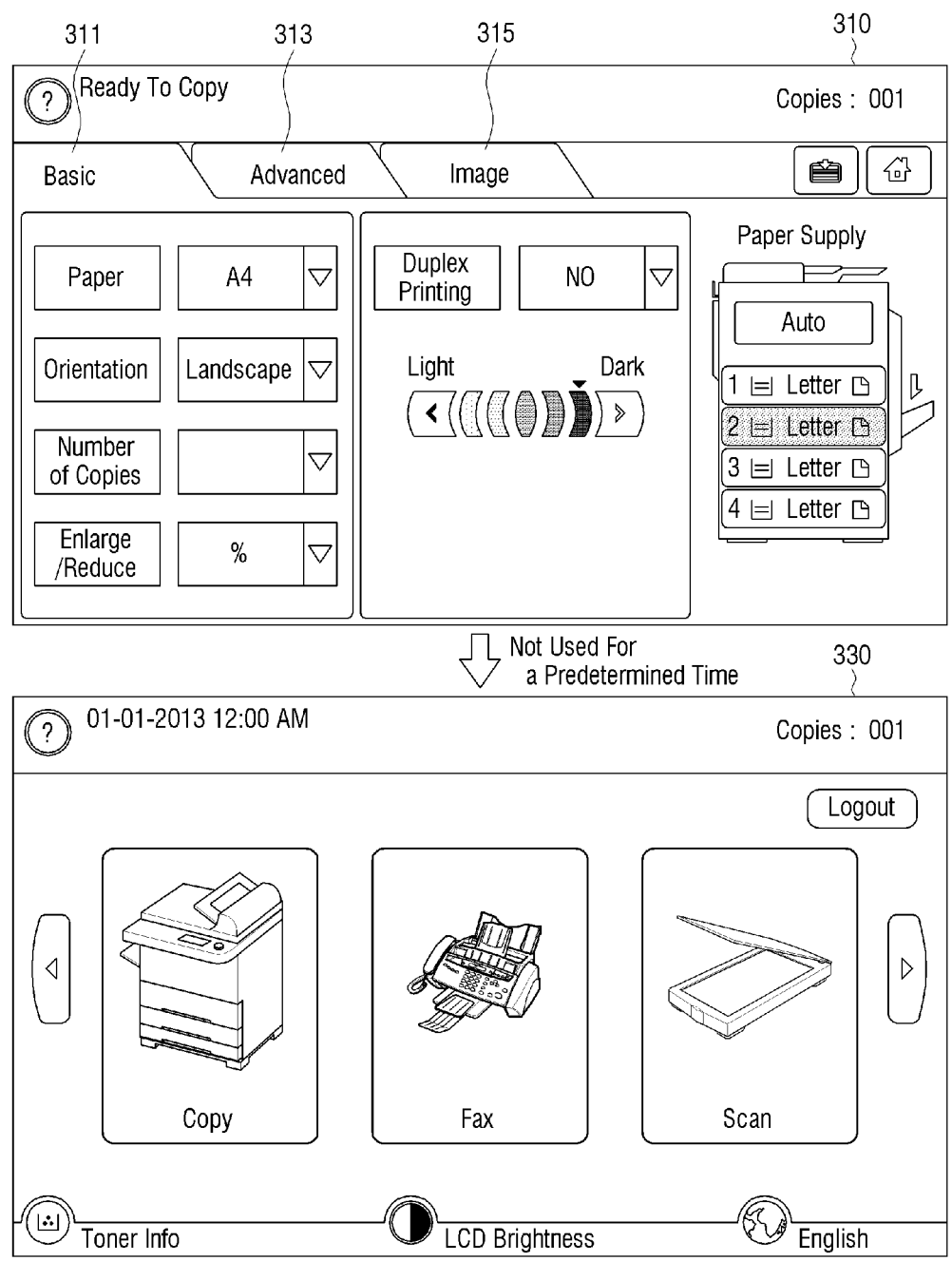
FIG. 3 illustrates a process of changing a setting UI to an initial UI according to non-use of a user.

FIG. 3 illustrates a method for returning to an initial screen (initial UI) when the user does not input any manipulation to the setting UI through which the user has input and a predetermined time elapses.

A setting UI 310 of FIG. 3 is a setting screen of a printer, which is an example of the image forming apparatus. Referring to FIG. 3, the user, for example, has chosen settings for a paper size, a print orientation, and duplex printing, but has not chosen settings for a number of copies and how much a view is reduced/enlarged. Even when the user does not separately store the setting information, the setting information may be recalled.

The setting UI 310 may include a plurality of pages 311, 313, and 315, and although not shown, the pages 313 and 315 may be pages for displaying a UI screen for setting. When the setting UI 310 includes the plurality of pages 311, 313, and 315, or includes a plurality of sub-menus, it may take a substantial amount of time to set the plurality of functions. Therefore, the problem of a possible deletion of settings chosen over a long time is addressed.

Referring to FIG. 3, the page displayed last, when the user does not input, is the page 311 from among the plurality of pages 311, 313, and 315. According to an embodiment, another display, e.g., an initial UI 330 may be automatically displayed when a predetermined time elapses.

Figure 4:
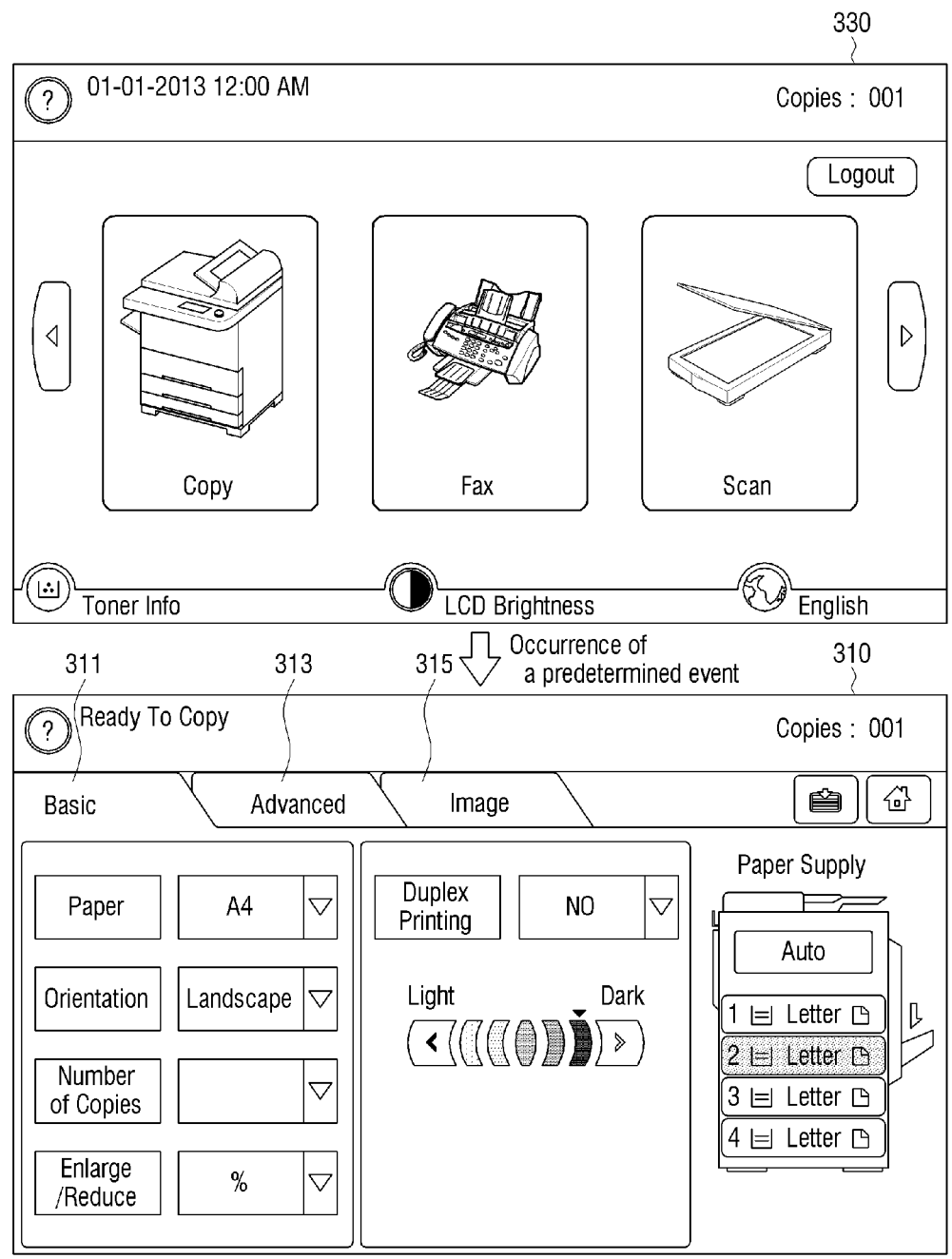
FIG. 4 illustrates a process of returning to a setting UI from an initial UI according to a predetermined event.

FIG. 4 illustrates a method for re-displaying the setting UI 310 through which the user has input when a predetermined event occurs on the initial UI 330.

As illustrated in FIG. 4, the page 311 that was displayed last from among the plurality of pages 311, 313, and 315 is displayed again and settings chosen through the other pages 313 and 315 are reflected.

Figure 5:
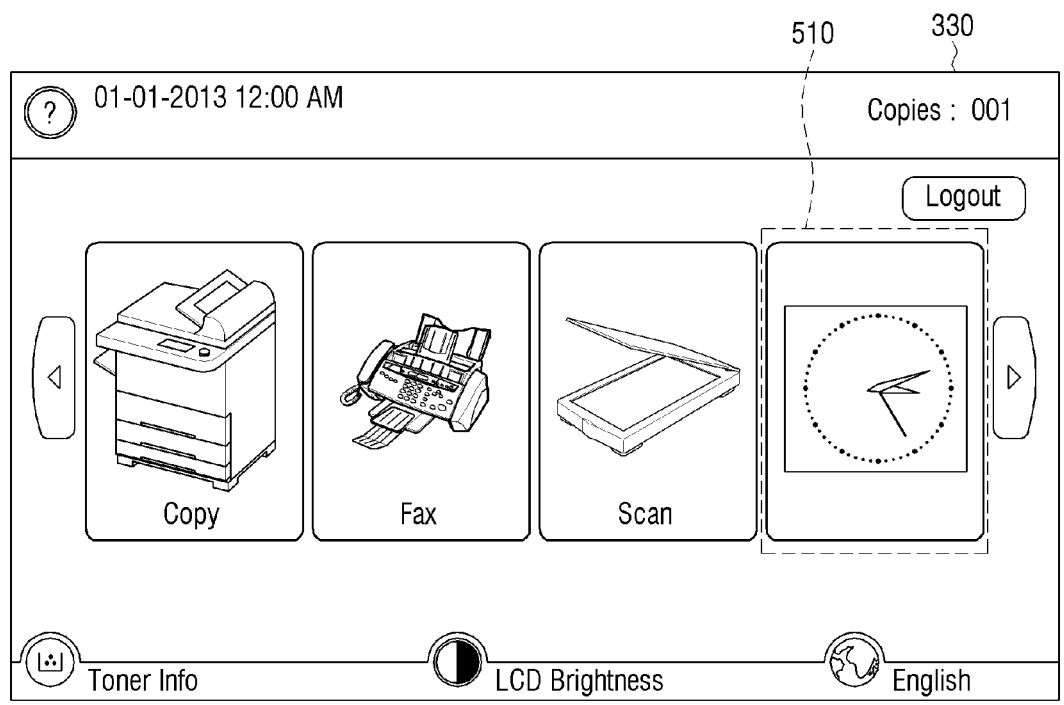
FIG. 5 illustrates an example of an initial UI including a shortcut icon to return to a setting UI.

FIG. 5 illustrates an example of an exemplary initial UI 330, for example, of FIGS. 3 and 4.

As illustrated in FIG. 5, a shortcut icon 510 is displayed on the initial UI 330, and, when a predetermined event in which the user selects the shortcut icon 510 occurs, the setting UI 310 (see, for example, FIGS. 3 and 4) is displayed again.

Figure 6:
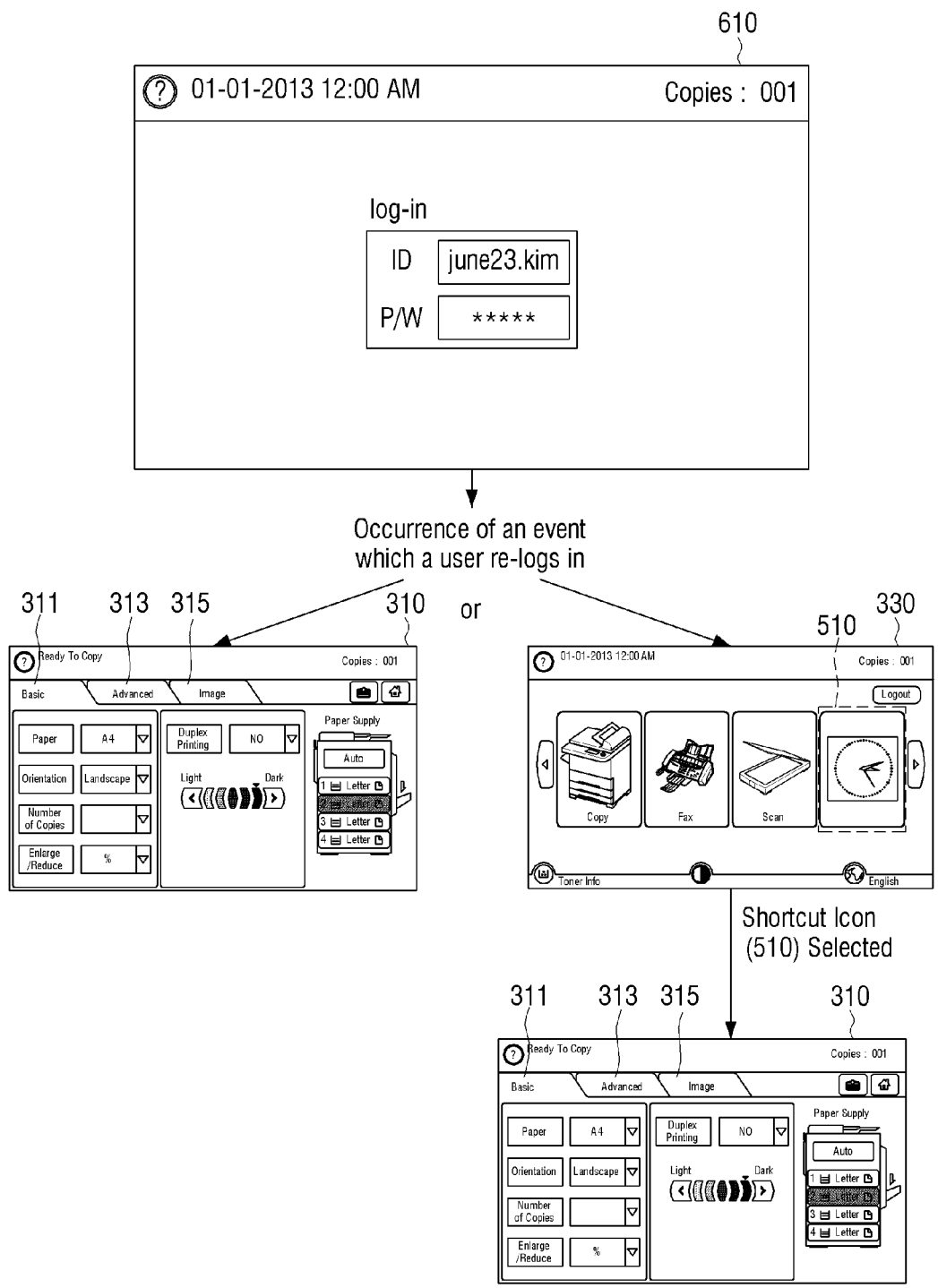
FIG. 6 illustrates various examples of a method for returning to a setting UI according to a user re-log in event.

FIG. 6 illustrates a case in which an occurrence of event, e.g. in which the user re-logs in occurs as an event for re-displaying the setting UI 310 (see, for example, FIGS. 3 and 4).

According to an exemplary embodiment, the image forming apparatus 100 may perform a user recognition function through login. For example, the setting information of the first user on values or items that the first user has input or selected through the setting UI after the user logged in is temporarily stored in the storage 170. When an event in which the first user re-logs in through a login screen 610 occurs as the predetermined event, the setting UI 310 reflecting the setting information of the first user may be re-displayed.

When the re-log in event of the first user occurs, the setting UI 310 may not be directly displayed and the initial UI 330 including the shortcut icon 510 may be displayed. When the shortcut icon 510 is selected, the setting UI 310 reflecting the setting information of the first user may be re-displayed so that the user's ability to select the function continued/completed.

The setting UI 310 may be re-displayed when events other than the selection of the shortcut icon or the user re-log in event illustrated, for example, in FIGS. 5 and 6 occur.

For example, after the setting UI is changed to the initial UI 330, when a certain button of the inputter 130 is selected in the power-saving state of the display 110, the setting UI 310 may be re-displayed. When the inputter 130 is implemented, for example, by using a mouse, the predetermined event may be moving the mouse. When the inputter 130 and the display 110 are implemented by using a touch screen, the predetermined event may be touching the touch screen. When the image forming apparatus 100 includes a camera, the image forming apparatus 100 may photograph the user using the camera, may analyze the image, and may detect the user's face. The controller 150 may recognize the user by comparing character information of the detected face with pre-stored character information, and may determine whether the user is the same user as a previous user. When it is determined that the user is the same user, the controller 150 may re-display the setting UI. The implementing method of the exemplary embodiments is not limited to the above-described exemplary embodiments.

Figure 7:
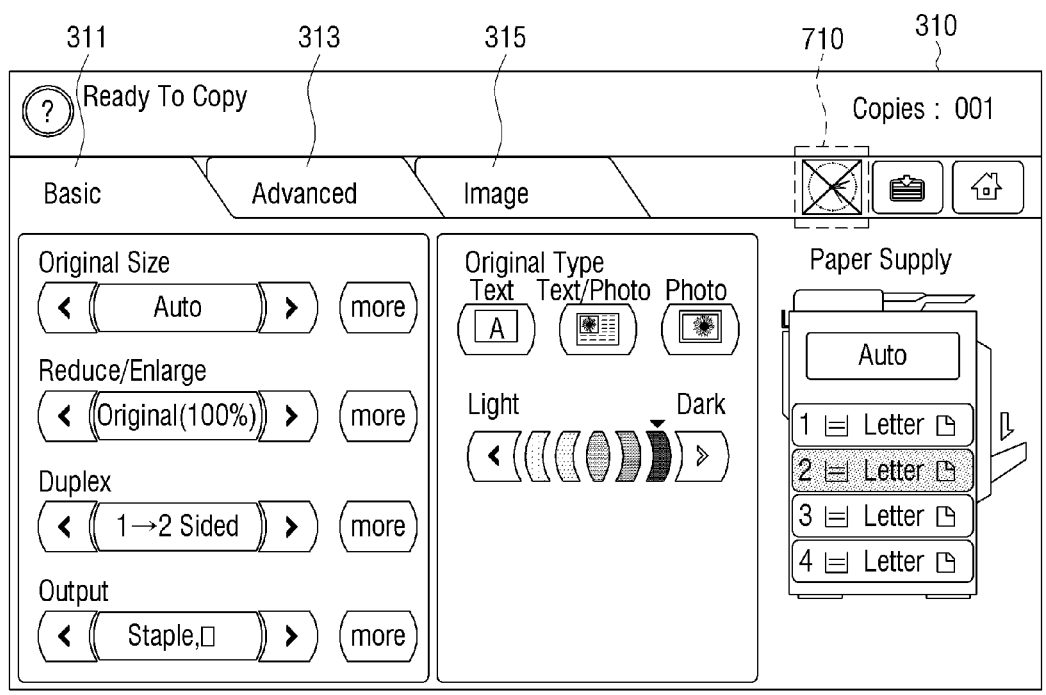
FIG. 7 illustrates a menu displayed on a setting UI including a plurality of pages to set a shortcut function.

FIG. 7 illustrates a menu 710 that may be displayed on the setting UI 310 including the plurality of pages to set a shortcut function to temporarily store setting information and return to the setting UI according to the predetermined event.

The user may set whether to temporarily store the setting information by selecting the menu 710 displayed on at least one of the plurality of pages 311, 313, and 315. Accordingly, the user is not required to move to a separate page to set whether to use the shortcut function, and thus a user's convenience is improved.

If such a menu 710 is not displayed and the image forming apparatus 100 is not set to use a shortcut function, when the user wants to again use the shortcut function, the user may have to leave the current setting page. If so, there may be an inconvenience in that the setting values that have been previously input may be initialized.

Accordingly, according to an exemplary embodiment in which the menu 710 is displayed on the setting page, the user can set the shortcut function without leaving the current page, and thus the user's convenience is improved.

Figure 8:
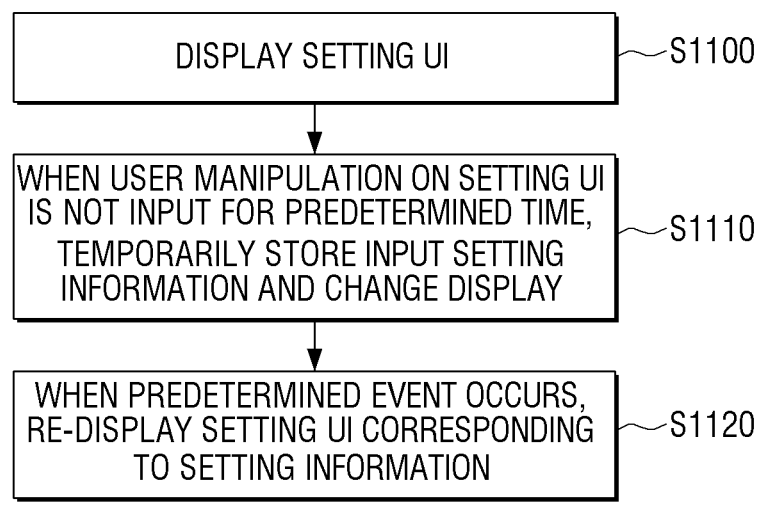
FIGS. 8 to 10 illustrate a method for providing a user interface according to various exemplary embodiments.

FIG. 8 is a flowchart illustrating a method for providing a user interface according to an exemplary embodiment.

Referring to FIG. 8, a setting UI for setting functions of an image forming apparatus 100 is displayed (S1100).

When the setting UI is displayed, a user may input setting information to set the functions. When a user manipulation is not input to the setting UI for a predetermined time before the user finishes setting the functions, the setting information that the user has input through the setting UI is temporarily stored and the display is changed, e.g., an initial UI is displayed (S1110).

When a predetermined event occurs after the initial UI is displayed, the setting UI corresponding to the setting information is re-displayed (S1120).

Figure 9:
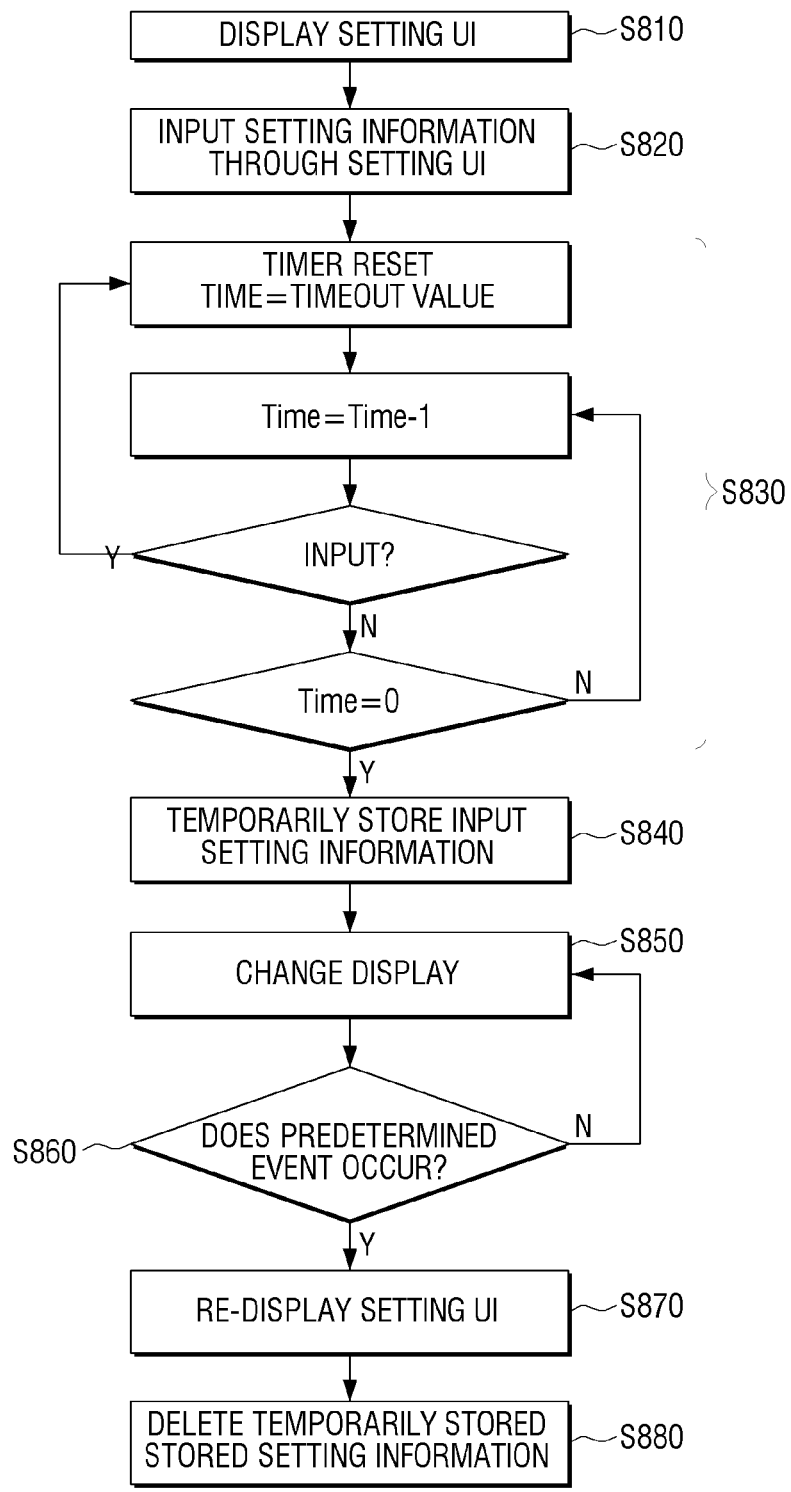

FIG. 9 is a flowchart illustrating a method for providing a user interface according to an exemplary embodiment.

Referring to FIG. 9, a setting UI for setting functions of an image forming apparatus 100 is displayed (S810).

When the setting UI is displayed, the user inputs setting information to set the functions (S820).

When the user does not provide an input for a certain time, e.g., leaves an area of the image forming apparatus 100 before the user finishes setting the functions, the controller 150 determines whether a user's manipulation is input to the setting UI for a predetermined time (S830).

The controller 150 may include a timer to measure elapsed time. Accordingly, the controller 150 may count the elapsed time that is measured by the timer and determine whether a variable (time) set as a predetermined time value (hereinafter, referred to as a "timeout value") reaches 0 while a user's input signal is not received.

When it is determined that the user's manipulation is not input for the predetermined time, the setting information that the user has already input is temporarily stored (S840). The temporarily stored setting information may include values that the user has not finished inputting through the setting UI, and/or, for example, information on a page number of a page that was displayed last from among the plurality of pages of the setting UI.

After the setting information is temporarily stored, the display is changed, e.g., a pre-stored initial UI 330 is displayed (S850).

After the display is changed, e.g., after the initial UI 330 is displayed, it is determined whether a predetermined event occurs (S860). According to an exemplary embodiment, the predetermined event refers to an event in which a shortcut icon 510 displayed on the initial UI 330 is selected.

When it is determined that the predetermined event occurs, the setting UI 310 corresponding to the temporarily stored setting information is re-displayed (S870). When the re-displayed setting UI 310 includes the plurality of pages 311, 313, and 315, the page that was displayed last from among the plurality of pages 311, 313, and 315 may be displayed based on the temporarily stored setting information. When the setting UI includes the plurality of pages as described above, the page that the user has input last is directly displayed.

After the setting UI 310 is re-displayed, the temporarily stored setting information is deleted (S880). By automatically deleting the setting information, storage space efficiency of the image forming apparatus 100 can be maximized.

Figure 10:
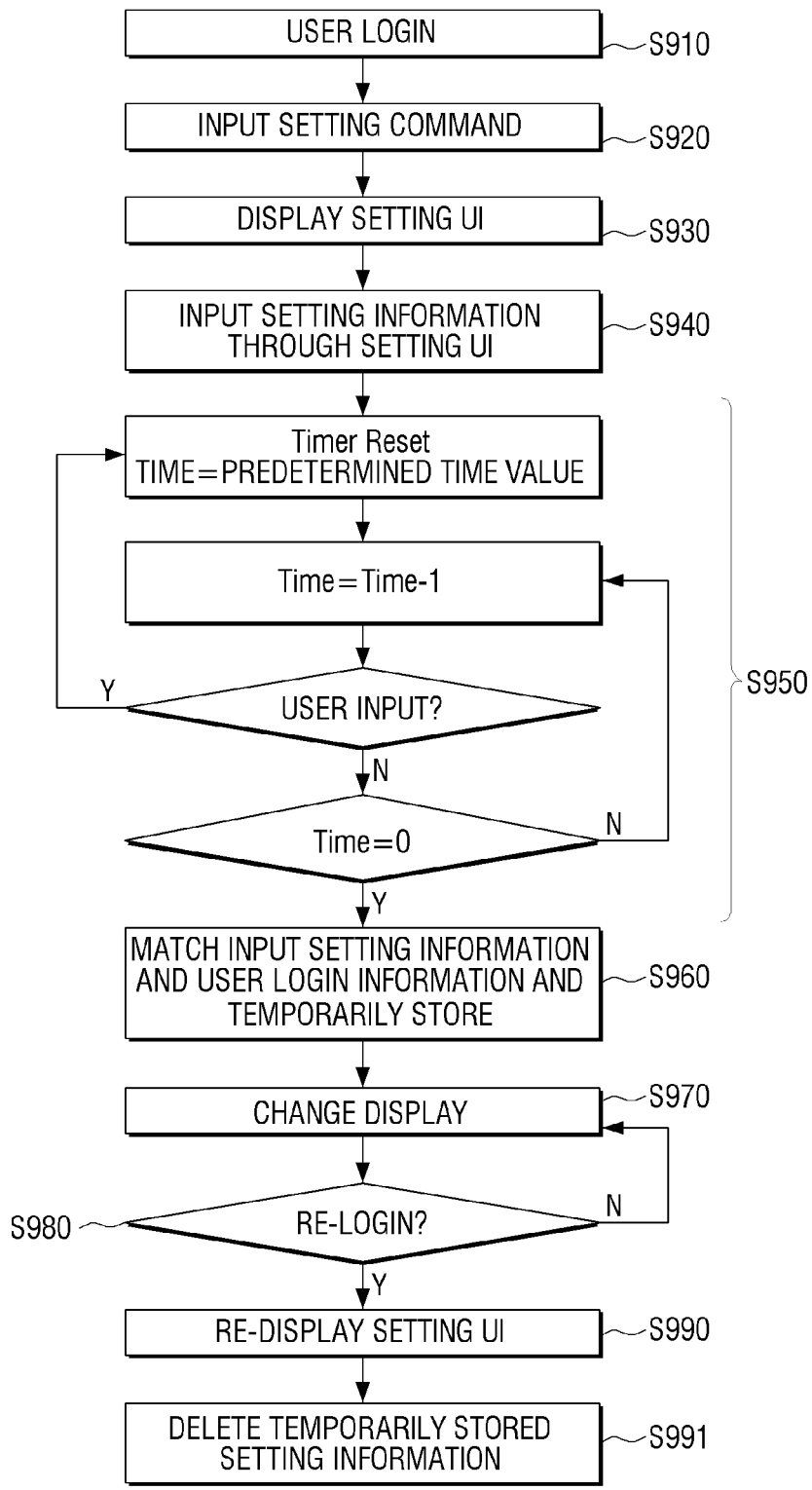

FIG. 10 is a flowchart illustrating a method for providing a user interface according to an exemplary embodiment.

As illustrated in FIG. 10, a user logs in (S910), and a user setting command to display a setting UI is input (S920). The setting command may be an action of selecting a specific menu to enter the setting UI.

The setting UI is displayed (S930). Setting information is input through the displayed setting UI 310 (S940), and it is determined whether a user manipulation is input to the setting UI 310 for a predetermined time (S950).

When it is determined that the user manipulation is not input for the predetermined time, the setting information that the user has already input is matched with login information of the user that has input the setting information and the matched information is temporarily stored (S960). Login information of a plurality of users (e.g., a first user, a second user, ... ) may be matched with the users' respective setting information and stored.

After the setting information is matched with the login information of the user and temporarily stored, the display is changed, e.g., an initial UI is displayed (S970).

When the same user re-logs in (S980), the setting UI corresponding to the setting information matched with the login information of the user and temporarily stored is re-displayed (S990). Accordingly, an event leading the redisplay of the setting UI 310 may be a user re-login event. Although not shown in FIG. 10, the event may be an event in which a shortcut icon 510 of the initial UI 330 generated after the user re-logs in is selected.

The user may login using various methods such as inserting an ID and/or a password into the login screen 610 as illustrated in FIG. 6, or a biometric information recognition method.

According to the login method, when the plurality of users (a first user, a second user, . . . ) share the single image forming apparatus 100, their respective setting information can be secured.

After the setting UI 310 is re-displayed, the temporarily stored setting information and user login information may be deleted (S991).

Figure 11:
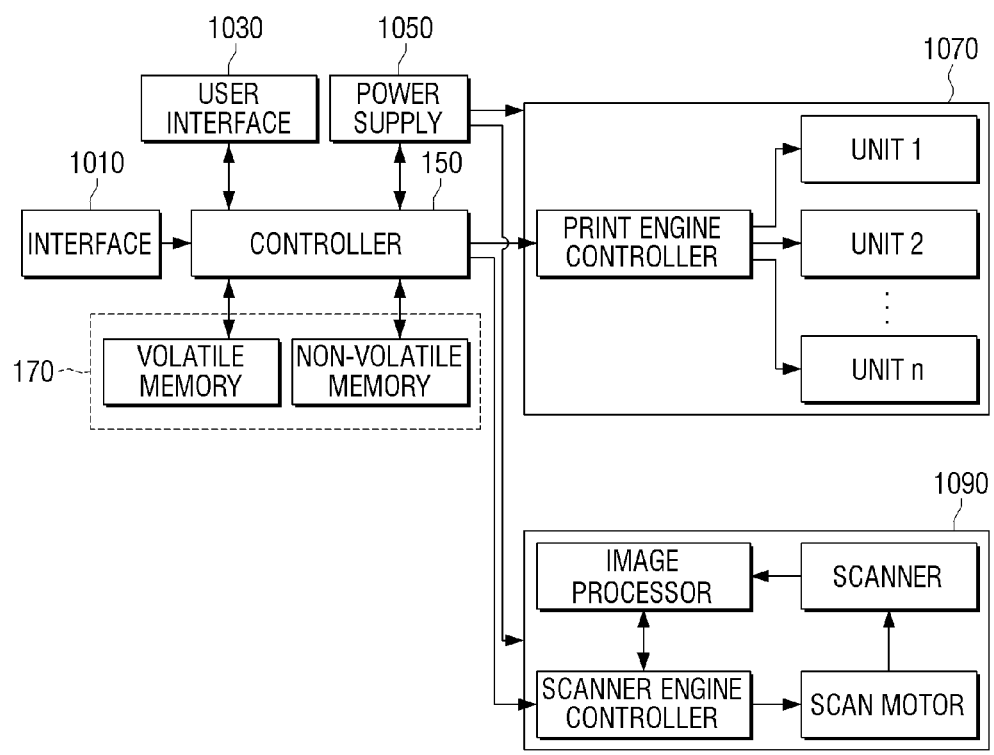
FIG. 11 illustrates a detailed configuration of an image forming apparatus according to various exemplary embodiments.

FIG. 11 illustrates exemplary elements of an image forming apparatus. Referring to FIG. 11, the image forming apparatus includes an interface 1010, a user interface 1030, a power supply 1050, a controller 150, a storage 170, a printer 1070, and a scanner 1090.

The interface 1010 may be connected with an external device through a network or a local network and may receive data and/or a command. That is, the interface 1010 may be connected with a host PC through a local interface and/or may be connected to a network in a wired and/or wireless manner, and may be connected with a plurality of external devices. The 802.11 standard of IEEE, the hyper LAN standard of Europe, or the MMAC-PC standard of Japan may be used as the wireless communication standard.

The user interface 1030 is an element for interacting with the user. The user interface 1030 may include the inputter 130 and the display 110.

The power supply 1050 supplies power to one or more elements of the image forming apparatus. The power supply 1050 receives alternating current (AC) power from an external source (AC_IN), converts the AC power into direct current (DC) power of an electric potential level appropriate to each element using a transformer, an inverter, and a rectifier, and outputs the DC power (DC_OUT).

The printer 1070 may include a print engine controller and a plurality of units 1 to n that are operated in a printing job.

The scanner 1090 may include a scanner engine controller, a scanning unit, a scan motor, and an image processor, and may be disposed on a top of the printer 1070.

When the user logs in and an image forming job is initiated by the user, the controller 150 performs an image forming job by applying various functions that are set based on setting information matched with login information of the user. When a toner saving function is set, the controller 150 transmits a command corresponding to the toner saving function to the print engine controller of the printer 1070. Accordingly, the print engine controller may reduce a resolution of a bitmap image.

The method for providing the user interface according to an exemplary embodiment may be coded as software and may be stored in a non-transitory computer-readable medium. The non-transitory computer-readable medium may be mounted in various apparatuses.

The non-transitory computer-readable medium refers to a medium that stores data semi-permanently, rather than storing data for a very short time, such as a register, a cache, and a memory, and is readable by an apparatus. The non-transitory computer readable medium may be a compact disc (CD), a digital versatile disk (DVD), a hard disk, a Blu-ray disk, a universal serial bus (USB), a memory card, and a read only memory (ROM).

In the above-described exemplary embodiments, an e image forming apparatus has been mainly described. However, other electronic apparatuses other than the image forming apparatus are within the scope of the exemplary embodiments. In particular, even in the case that the functions are set through a setting UI on the host apparatus connected with the image forming apparatus, when a user manipulation is not input for a predetermined time, the setting UI may be deleted and the initial UI may be displayed as described above, or a display of the host apparatus may be turned off. The host apparatus may be implemented by using various apparatuses such as a PC, a notebook PC, a mobile phone, a tablet PC, a digital camera, etc.

An exemplary embodiment may directly be applied to any apparatus that can set functions through a user interface, such as a PC, a notebook PC, a mobile phone, a tablet PC, a digital camera, a TV, etc.

The foregoing exemplary embodiments and advantages are merely exemplary and are not to be construed as limiting the present inventive concept. The exemplary embodiments can be applied to other types of apparatuses. Also, the description of the exemplary embodiments is intended to be illustrative, and not to limit the scope of the claims.

What is claimed is:

1. A method for providing a user interface of an image forming apparatus, the method comprising:
   displaying a setting user interface (UI) to set a function of the image forming apparatus on a display of the image forming apparatus, by a controller of the image forming apparatus;
   when a user manipulation is not input to the setting UI for a predetermined time before a user finishes setting the function, temporarily storing setting information that the user has input through the setting UI in a storage of the apparatus and displaying an initial UI on the display, by the controller; and
   when a predetermined event occurs, re-displaying the setting UI corresponding to the setting information on the display, by the controller.

2. The method as claimed in claim 1, wherein a shortcut icon is displayed on the initial UI and the event is an event in which the shortcut icon is selected.

3. The method as claimed in claim 1, wherein the setting UI comprises a plurality of pages,
   wherein the re-displaying the setting UI comprises re-displaying a page that was displayed last from among the plurality of pages based on the setting information.

4. The method as claimed in claim 3, wherein at least one of the plurality of pages displays a menu for setting a shortcut function to temporarily store the setting information and return to the setting UI according to the event.

5. The method as claimed in claim 1, further comprising, when the setting UI is re-displayed, deleting the setting information.

6. The method as claimed in claim 1, wherein the setting UI is displayed when the user logs in and inputs a setting command for the function,
   wherein the setting information is matched with user login information and stored,
   wherein the event is an event in which the user re-logs in.

7. The method as claimed in claim 1, wherein the setting UI is displayed when the user logs in and inputs a setting command for the function,
   wherein the setting information is matched with user login information and stored,
   wherein the re-displaying the setting UI corresponding to the setting information comprises:
      when the user re-logs in, displaying a shortcut icon on the initial screen; and
      when an event in which the shortcut icon is selected occurs, re-displaying the setting UI.

8. An image forming apparatus comprising:
- a display configured to display a setting User Interface (UI) to set a function of the image forming apparatus;
- an inputter configured to receive setting information which is set through the setting UI; and
- when a user manipulation is not input to the setting UI for a predetermined time before a user finishes setting the function, a controller configured to temporarily store the setting information that the user has input in a storage and display an initial UI on the display,
- wherein, when a predetermined event occurs, the controller re-displays the setting UI corresponding to the setting information on the display.

9. The image forming apparatus as claimed in claim 8, wherein a shortcut icon is displayed on the initial UI and the event is an event in which the shortcut icon is selected.

10. The image forming apparatus as claimed in claim 8, wherein the setting UI comprises a plurality of pages,
- wherein, when the predetermined event occurs, the controller re-displays a page that was displayed last from among the plurality of pages based on the setting information.

11. The image forming apparatus as claimed in claim 10, wherein at least one of the plurality of pages displays a menu for setting a shortcut function to temporarily store the setting information and return to the setting UI according to the event.

12. The image forming apparatus as claimed in claim 8, wherein, when the setting UI is re-displayed, the controller deletes the setting information from the storage.

13. The image forming apparatus as claimed in claim 8, wherein the display displays the setting UI when the user logs in and inputs a setting command for the function,
- wherein the controller matches the setting information with user login information and stores the setting information with the user login information in the storage,
- wherein the event is an event in which the user re-logs in.

14. The image forming apparatus as claimed in claim 8, wherein the display displays the setting UI when the user logs in and inputs a setting command for the function,
- wherein the controller matches the setting information with user login information and stores the setting information with the user login information in the storage,
- wherein, when the user re-logs in, the controller displays a shortcut icon on the initial screen, and, when an event in which the shortcut icon is selected occurs, re-displays the setting UI.

15. The image forming apparatus as claimed in claim 8, further comprising the storage configured to store the setting information.

16. A method for providing a user interface of an apparatus, the method comprising:
- displaying an initial user interface (UI) to set a function of the apparatus on a display of the apparatus, by a controller of the apparatus;
- when an incomplete setting of the UI is input and a predetermined time has passed, temporarily storing the incomplete setting in a storage of the apparatus and displaying an initial UI on the display, by the controller; and
- when a predetermined event occurs, displaying a UI corresponding to the temporarily stored setting information on the display, by the controller.

17. The method as claimed in claim 16, wherein the initial UI is a blank screen.

* * * * *